(12) United States Patent
Li et al.

(10) Patent No.: US 12,724,700 B2
(45) Date of Patent: Sep. 1, 2026

(54) AUTO-FIX OBJECT NOT FOUND ERROR USING IMAGE RECOGNITION

(71) Applicant: MICRO FOCUS LLC, Santa Clara, CA (US)

(72) Inventors: Bin Li, Shanghai (CN); Renber Xue, Shanghai (CN); Wen-Jie Qian, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 185 days.

(21) Appl. No.: 18/107,420

(22) Filed: Feb. 8, 2023

(65) Prior Publication Data

US 2024/0264928 A1 Aug. 8, 2024

(51) Int. Cl.

| | |
|---|---|
| ***G06F 9/44*** | (2018.01) |
| ***G06F 9/445*** | (2018.01) |
| ***G06F 9/45*** | (2006.01) |
| ***G06F 9/455*** | (2018.01) |
| ***G06F 11/3668*** | (2025.01) |
| ***G06T 7/62*** | (2017.01) |
| ***G06V 10/25*** | (2022.01) |

(52) U.S. Cl.

CPC ...... *G06F 11/3688* (2013.01); *G06F 11/3684* (2013.01); *G06T 7/62* (2017.01); *G06V 10/25* (2022.01); *G06V 2201/07* (2022.01)

(58) Field of Classification Search

CPC ............. G06F 11/3688; G06F 11/3684; G06F 11/3692; G06V 10/25; G06V 2201/07; G06T 7/62

See application file for complete search history.

(56) References Cited

U.S. PATENT DOCUMENTS

| | | | |
|---|---|---|---|
| 7,831,542 | B2 | 11/2010 | Milov |
| 9,703,770 | B2 | 7/2017 | Bartley et al. |
| 10,963,731 | B1 | 3/2021 | Sarkar et al. |

(Continued)

FOREIGN PATENT DOCUMENTS

| | | | |
|---|---|---|---|
| CN | 103034583 | A | 4/2013 |
| CN | 111679976 | A | 9/2020 |

(Continued)

OTHER PUBLICATIONS

Filippo Ricca, AI-based Test Automation: A Grey Literature Analysis, 2021, pp. 1-8. https://ieeexplore.ieee.org/stamp/stamp.jsp?tp=&arnumber=9440153 (Year: 2021).*

(Continued)

*Primary Examiner* — Mongbao Nguyen
(74) *Attorney, Agent, or Firm* — Sheridan Ross P.C.

(57) ABSTRACT

A system, device, system-on-a-chip, and method of automatically correcting an object not found error using image recognition are described. The method includes running a test script for testing and analysis of a web page as rendered by a web browser. The method further includes, responsive to detecting the object not found error, automatically locating a missing object associated with the object not found error. One method of locating a missing object includes using image recognition. The method also includes updating the test script with a located object. The method may also include replaying the test script.

20 Claims, 5 Drawing Sheets

(56) References Cited

U.S. PATENT DOCUMENTS

| | | | | |
|---|---|---|---|---|
| 11,907,107 | B2 * | 2/2024 | Kumar | G06F 18/217 |
| 2020/0073686 | A1 * | 3/2020 | Hanke | G06F 18/22 |
| 2022/0114368 | A1 * | 4/2022 | Mukherjee | G06N 3/09 |
| 2022/0121723 | A1 * | 4/2022 | Page | G06F 11/0784 |
| 2022/0147439 | A1 * | 5/2022 | Shang | G06F 3/04842 |
| 2022/0171510 | A1 * | 6/2022 | Fredericks | G06F 3/04842 |
| 2022/0261336 | A1 * | 8/2022 | Luzon | G06N 20/00 |
| 2022/0326917 | A1 * | 10/2022 | Chintala | G06F 8/38 |
| 2022/0391621 | A1 * | 12/2022 | Chen | G06T 7/20 |
| 2023/0214239 | A1 * | 7/2023 | Singh | G06N 3/0464 715/704 |
| 2023/0393963 | A1 * | 12/2023 | Mangat | G06F 11/3612 |
| 2024/0233311 | A1 * | 7/2024 | Jiang | G06T 7/11 |

FOREIGN PATENT DOCUMENTS

| | | | | |
|---|---|---|---|---|
| CN | 113535587 | A * | 10/2021 | G06F 11/3688 |
| CN | 114064157 | A | 2/2022 | |
| CN | 114329149 | A | 4/2022 | |
| WO | WO-2020047040 | A1 * | 3/2020 | G06F 11/368 |

OTHER PUBLICATIONS

English translation, Hanke et al. (WO 2020047040 A1), pp. 1-18, 2020. (Year: 2020).*

English translation, Hanke et al. (WO 2020047040 A1), pp. 1-14, 2020. (Year: 2020).*

Michel Nass, Similarity-based web element localization for robust test automation, 2022, pp. 1-25. chrome-extension://efaidnbmnnnibpcajpcglclefindmkaj/https://arxiv.org/pdf/2208.00677 (Year: 2022).*

Zebao Gao, SITAR: GUI Test Script Repair, 2016, pp. 1-17. https://ieeexplore.ieee.org/stamp/stamp.jsp?tp=&arnumber=7214294 (Year: 2016).*

Frolin S. Ocariza, AutoFLox: An Automatic Fault Localizer for Client-Side JavaScript, 2012, pp. 1-10. https://ieeexplore.ieee.org/stamp/stamp.jsp?tp=&arnumber=6200094 (Year: 2012).*

Nikolaj Buhl, How to Find and Fix Label Errors, 2022, pp. 1-15. https://encord.com/blog/find-and-fix-label-errors-guide/ (Year: 2022).*

* cited by examiner

AUTO-FIX OBJECT NOT FOUND ERROR USING IMAGE RECOGNITION

FIELD

The disclosure relates generally to software testing and particularly to software testing using image analysis.

BACKGROUND

Traditional software programming methods typically use information from the code base of an application for developing test software. For example, a developer of a test script may use a Document Object Model (DOM) of a web page to develop a set of test scripts to test the application. One problem with this approach is that the developer of the test script may not actually have access to the source code of the application under test. For example, the application under test is still being developed or the application under test is being tested by a third party. Another problem is that changes may be made to the DOM, requiring each test script based on that DOM to be manually updated.

SUMMARY

Generally, browser-based protocols (e.g., TruClient protocol) handle objects in an application under test (AUT) by interacting with a web page DOM. The browser-based protocol finds each object(s) by executing JavaScript methods within the page document. Typically, there are several methods to find an object (e.g., Element Attributes, JavaScript Path, XPath, CSS selectors, etc.). All of these methods work by executing some JavaScript code within the AUT page context. The methods can access the DOM of a web page directly. However, relying on the DOM makes these methods overly sensitive to changes to the DOM.

During a test, there are many issues related to the object finding process. A common issue is failure to find an object during testing (e.g., object not found error). When viewing the web page, the object may be there (e.g., visually detectable), but not detected by the test script. There are several reasons this may happen: (1) the AUT page has been updated (e.g., the DOM of the web page has been updated), and target element attributes or the path has changed; (2) the test script may be a legacy script, and the element identification is not compatible with the new code; or (3) differences between browsers (e.g., Chrome and Firefox). To fix the object not found error, each script must be manually updated to replace the attributes/path for each missing element in the test script with an updated/new attribute/path for each missing object. Depending on the number of scripts and/or missing objects, this may be a very time-consuming task to perform manually. Alternatively, if the test script is an automation script, it may break the automation process, and each script still needs to be updated manually.

Although there are several methods to find the "missing" object/element, they all rely on the similar DOM structure. The present disclosure uses an alternative method to find each "missing" object/element. Instead of relying on the DOM structure, the present disclosure utilizes image recognition to find "missing" objects. In other words, the present disclosure does not rely on the DOM structure and only needs to use the visual part of a web page. Using image recognition, the present disclosure may also utilize Artificial Intelligence (AI) technology.

These and other needs are addressed by the various embodiments and configurations of the present disclosure. An image of a graphical user interface is captured. For example, a screen shot of a browser display is captured. Text syntax is executed that contains one or more parameters for identifying a graphical object. For example, the text syntax may identify a rectangle that contains the text "OK" where the text is red. Based on the text syntax, a graphical object is identified in the image of the graphical user interface. Information is returned that identifies the target element attributes/path. For example, coordinates of the graphical object are identified. This information can then be used in update a test script used to test the graphical user interface. In embodiments, the test script may automatically be updated with the returned information.

Systems and methods as described herein offer a number of advantages over conventional approaches. Rather than relying on the DOM structure, the disclosed systems and methods use an alternative method to find each "missing" object/element.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
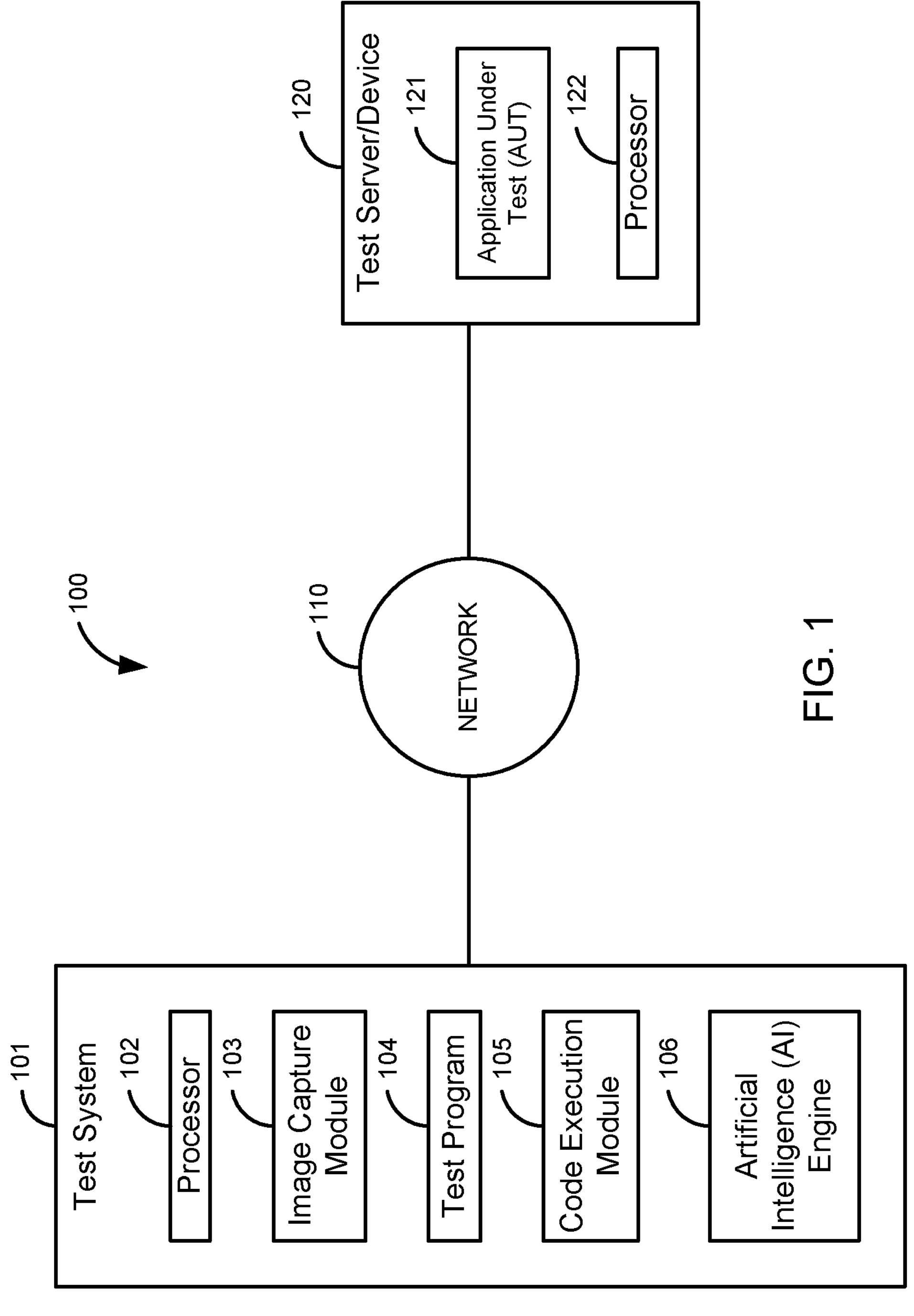
FIG. 1 is a block diagram of a first illustrative system for automatically fixing an object not found error using image recognition in accordance with one or more embodiments of the present disclosure.

The present disclosure can provide a number of advantages depending on the particular configuration. These and other advantages will be apparent from the disclosure contained herein.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "execute" as described herein and in the claims refers to the execution/interpretation of text syntax. For example, the text syntax may be executed during runtime by an interpreter. The text syntax may be compiled into a binary executable and executed during runtime.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

The present disclosure relates to a method, device, and system for automatically fixing an object not found error using image recognition. In embodiments, a "missing" object is found using one or more attributes of the "missing' object. In embodiments, a "missing" object is found using image recognition on a captured image of the AUT.

Example embodiments may be configured according to the following:

(21) A system, the system comprising:

a processor; and a memory coupled with and readable by the processor and storing therein a set of instructions which, when executed by the processor, causes the processor to automatically correct an object not found error by:

running a test script for testing and analysis of a web page as rendered by a web browser;

responsive to detecting the object not found error, automatically locating a missing object associated with the object not found error;

updating the test script with a located object; and replaying the test script.

(2) The system of any of (1), wherein automatically locating the missing object further comprises:

using Artificial Intelligence (AI) image recognition to locate the missing object associated with the object not found error.

(3) The system of any of (1)-(2), wherein automatically locating the object further comprises:

determining key attributes for the missing object associated with the object not found error.

(4) The system of any of (1)-(3), wherein the key attributes comprise at least one of: a tag name, an identifier (id), a class, a role, a type, and a name.

(5) The system of any of (1)-(4), wherein the key attributes are determined by processing a Document Object Model (DOM) associated with the web page.

(6) The system of any of (1)-(5), wherein automatically locating the missing object associated with the object not found error further comprises:

determining position and size information for the missing object associated with the object not found error;

determining a target region for the missing object associated with the object not found error based on the position and size information for the missing object; and locating an object in the determined target region.

(7) The system of any of (1)-(6), wherein automatically locating the missing object associated with the object not found error further comprises:

responsive to more than one object being located in the determined target region, selecting a topmost object for updating the test script with the located object.

(8) The system of any of (1)-(7), wherein automatically locating the missing object associated with the object not found error further comprises:

responsive to more than one target region being located, determining key attributes for the missing object; and locating the missing object based on the determined key attributes.

(9) A method to automatically correct an object not found error, the method comprising:

running a test script for testing and analysis of a web page as rendered by a web browser;

responsive to detecting the object not found error, automatically locating a missing object associated with the object not found error;

updating the test script with a located object; and replaying the test script.

(10) The method of (9), wherein automatically locating the object associated with the object not found error further comprises:

using Artificial Intelligence (AI) image recognition to locate the missing object associated with the object not found error.

(11) The method of any of (9)-(10), further comprising:

determining key attributes for the missing object associated with the object not found error.

(12) The method of any of (9)-(11), wherein the key attributes comprise at least one of: a tag name, an identifier (id), a class, a role, a type, and a name.

(13) The method of any of (9)-(12), wherein the key attributes are determined by processing a Document Object Model (DOM) associated with the web page.

(14) The method of any of (9)-(13), wherein automatically locating the missing object further comprises:

determining position and size information for the missing object associated with the object not found error;

determining a target region for the missing object based on the position and size information for the missing object; and locating an object in the determined target region.

(15) The method of any of (9)-(14), further comprising:

responsive to more than one object being located in the determined target region, selecting a topmost object for updating the test script with the located object.

(16) A non-transitory, computer-readable medium comprising a set of instructions stored therein which, when executed by a processor, causes the processor to automatically correct an object not found error by:

running a test script for testing and analysis of a web page as rendered by a web browser;

responsive to detecting the object not found error, automatically locating a missing object associated with the object not found error;

updating the test script with a located object; and replaying the test script.

(17) The non-transitory, computer-readable medium of (16), wherein the set of instructions, when executed by the processor cause the processor further to:

automatically locating the missing object associated with the object not found error using Artificial Intelligence (AI) image recognition.

(18) The non-transitory, computer-readable medium of any of (16)-(17), wherein the set of instructions, when executed by the processor cause the processor further to:

determine key attributes for the missing object associated with the object not found error, wherein the key attributes comprise at least one of: a tag name, an identifier (id), a class, a role, a type, and a name.

(19) The non-transitory, computer-readable medium of any of (16)-(18), wherein the set of instructions, when executed by the processor cause the processor further to:

determine position and size information for the missing object associated with the object not found error;

determine a target region for the missing object associated with the object not found error based on the determined position and size information for the missing object; and locate an object in the determined target region.

(20) The non-transitory, computer-readable medium of any of (16)-(19), wherein the set of instructions, when executed by the processor cause the processor further to:

responsive to more than one object being located in the determined target region, select a topmost object for updating the test script with the located object.

(21) The non-transitory, computer-readable medium of any of (16)-(20), wherein the set of instructions, when executed by the processor cause the processor further to:

responsive to more than one target region being located, determine key attributes for the missing object associated with the object not found error; and locate the missing object associated with the object not found error based on the determine key attributes.

FIG. 1 is a block diagram of a first illustrative system 100 for automatically fixing an object not found error using image recognition. The first illustrative system 100 comprises a test system 101, a network 110, and a test server/device 120.

The test system 101 comprises a processor 102, an image capture module 103, a test program 104, a code execution module 105, and an AI engine 106. The test system 101 can be or may include any device used for testing the test server/device 120, such as a Personal Computer (PC), a telephone, a video system, a cellular telephone, a Personal Digital Assistant (PDA), a tablet device, a notebook device, a smartphone, a server, and/or the like. Although not shown in FIG. 1, the test system 101 may comprise multiple test systems 101. For example, the test system 101 may comprise a plurality of test systems 101 that test the test server/device 120 in parallel and/or in series.

The processor 102 can be, or may include, any kind of processor that can process computer code, such as a hardware processor, a microprocessor, a micro controller, a multi-core processor, an application specific processor, a virtual machine, and/or the like.

The image capture module 103 can be, or may include, any software/hardware that can capture and process an image. The image capture module 103 may capture an image using a camera or may directly capture the image that is generated by the test system 101. For example, the image capture module 103 may capture an image that is generated directly from a headless browser.

The test program 104 can be, or may include, any software/hardware that can generate test(s) for testing the application under test (AUT) 121. The test program 104 can be written in various programming languages, such as C, C++, Java, JavaScript, Hyper Text Markup Language (HTML), PERL, and/or the like. The test program 104 may include any of the test scripts/Application Programming Languages (APIs)/text syntax described herein in conjunction with any known programming languages.

The code execution module 105 can be, or may include, any hardware/software that can be used to execute the test program 104. The code execution module 105 may run any developed test scripts/test programs 104 using the text syntax/APIs described herein. The code execution module 105 may be a code interpreter, may execute code that has been compiled into binary code, and/or the like.

The AI engine 106 can be or may include any software/hardware process that can learn based on an input, such as supervised machine learning, unsupervised machine learning, reinforcement machine learning, and/or the like. The AI engine 106 can be used to identify graphical objects in a graphical user interface as described below in FIG. 2.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Integrated Services Digital Network (ISDN), Hyper Text Markup Language (HTML), Web Real-Time Transport (WebRTC) protocol, and/or the like. Thus, the network 110 is an electronic communication network configured to carry messages via packets and/or circuit switched communications.

The test server/device 120 can be or may include any server/device that can support an application under test 121. For example, the test server/device 120 may be a file server, a web server, an application server, a computer, an embedded device, or any device that generates a graphical user interface that can be tested. The test server/device 120 further comprises the application under test 121 and a processor 122.

The application under test 121 can be or may include any application that has a graphical user interface that can be tested. The application under test 121 is tested by the test program 104 using the processes described herein in conjunction with known testing techniques. The processor 122 may be similar to the processor 102. For example, the processor 122 may be a microprocessor. In one embodiment, the test system 101 may be part of the test server/device 120. In this embodiment, the network 110 may not be used and the test system is executed on the test server/device 120.

Figure 2:
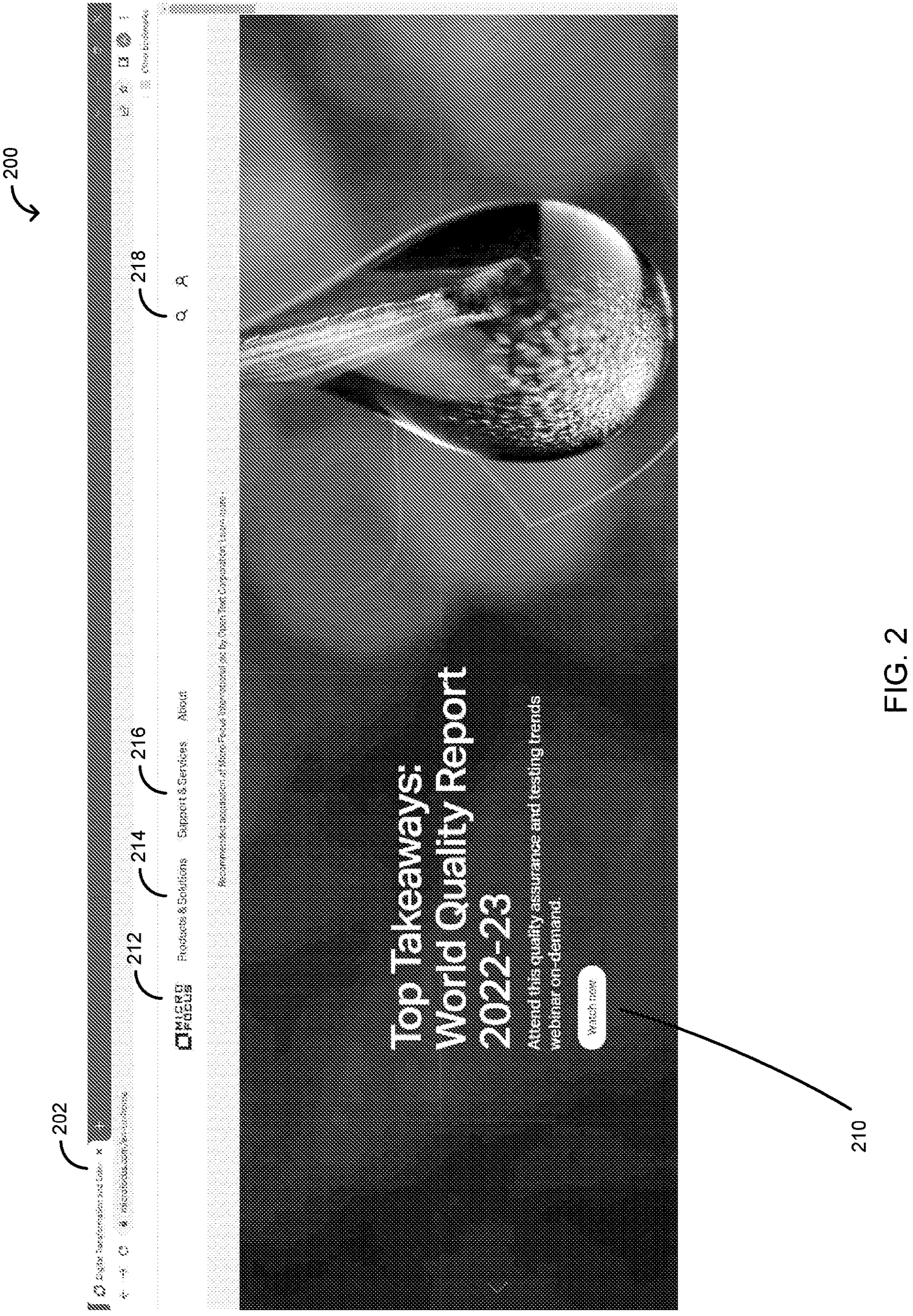
FIG. 2 is an example browser 200 and web page 202 in accordance with one or more embodiments of the present disclosure.

FIG. 2 illustrates an example of a browser 200 displaying a web page 202 with objects 210, 212, 214, 216, and 218. The objects 210, 212, 214, 216. And 218 may comprise any known graphical object, such as buttons, radio buttons, text boxes, text areas, check boxes, menus, menu items, lists, icons, images, tab fields, scrollbars, circles, ovals, triangles, hexagons, boxes, star shapes, and/or the like based on being trained using similar graphical objects.

If the web page 202 is the application under test, and the "Watch now" button 210 is the object not found, we can use image recognition to find the new attributes/path of the "missing" object (e.g., the "Watch now" button 210).

In a first option, the present disclosure using image recognition/AI finds the "missing" object (e.g., the "Watch now" button 210) by using attributes of the element (e.g., name, text, role, other information, etc.).

The AI engine 106 may find the object by the element's type and value, or with other attributes. In this example, the syntax for locating the "missing" object (e.g., the "Watch now" button 210) may look like the following:

```
POST http://localhost:8000/ai/v1/detect HTTP/1.1
Content-Type: application/json
User-Agent: PostmanRuntime/7.29.0
Accept: */*
Postman-Token: ca9e14ab-de86-4f34-9732-0a6da4406a29
Host: localhost: 8000
Accept-Encoding: gzip, deflate, br
Connection: keep-alive
Content-Length: 78367
```

-continued

```
{
  "metadata": {
    "technology": {
      "name": "web"
    }
  },
  "options": {
    "bypass_cache": true
  },
  "control": {
    "control_class": "button",
    "text": {
      "value": "Google Search",
      "match_method": "ai"
    }
  },
  "image": {
    "image_type": "png",
    "base64": "ivBORw0KGgoAAAANSUhEUgAAB7cAAAUZCAIAAACHGRJ
 }
}
```

Another option of finding the "missing" object is using template matching on an image that may be recorded during a test, and during replay the captured image may be used to find the "missing' object.

For example, the captured image is of the whole AUT page (e.g., the web page 202). Using the captured image, the target object's (e.g., the "Watch now" button 210) position and size information may be determined (e.g., a region where the object is located). In other words, the target object is located in the region, and finding the underlying element at the center point of the region, the target object is located. It is possible that there may be more than one element under the specific point. But since only the topmost one can be visible, the others will be ignored.

Following is an example code:

```
let centerPosX = region.x + region.width / 2;
let centerPosY = region.y + region.height / 2;
let element = document.elementFromPoint(centerPosX, centerPosY);
```

The AUT may be complex, and more than one region may be determined. If more than one region is detected, the present disclosure may check some of the key attributes (e.g., tag name, ID, class, role, type, name, or other element type specific attributes) between the old element and all of the candidate elements detected. Key attributes, rather than all of the attributes, are compared because some attribute values may have changed after the AUT was updated, causing the object not found error. There are key attributes that may be more important than others. If an element has different values on these key attributes, it generally means it is a different element. If there is an element that has the same values for the key attributes as the "missing" element, then the candidate element is most likely the target element (e.g., the missing element/object).

Following is example pseudo-code to do this:

```
let targetEle;
for (let ele in allCandidateElems) {
  let is Equal = true;
  for (let prop in keyAttrs) {
    if (ele[prop] !== oldElem[prop]) {
      isEqual = false;
      break;
```

-continued

```
      }
    }
    if (is Equal) {
      targetEle = ele;
      break;
    }
  }
```

Figure 3:
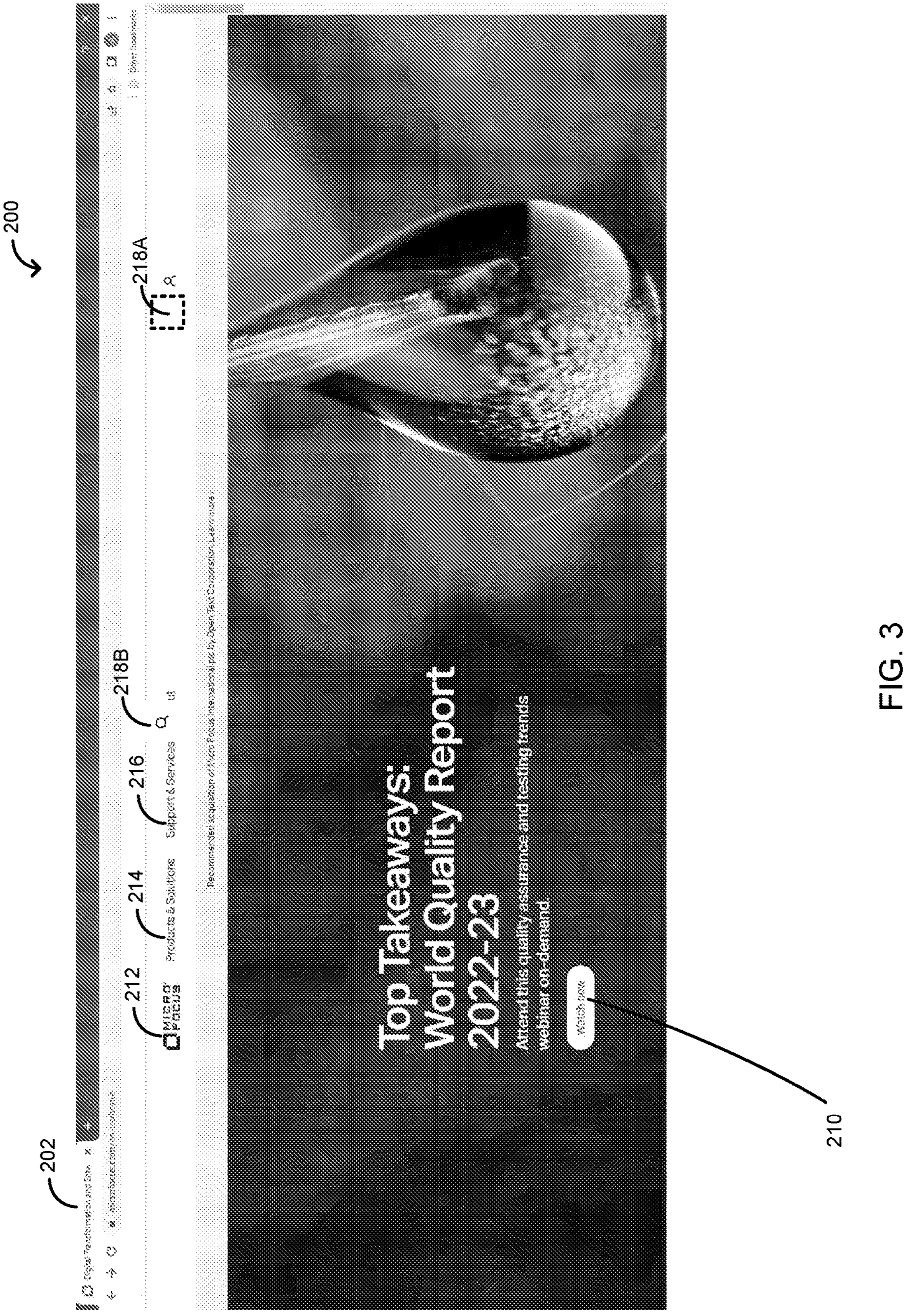
FIG. 3 is the example browser 200 and web page 202 in accordance with one or more embodiments of the present disclosure.

Now if we can find a proper target element, the last step is replacing the old attributes/paths for the "missing" element with the new attributes/paths for the "missing" element and updating the test script. Update of the test script may be automated as part of the process disclosed herein. Alternatively, the test script may suggest an update to be confirmed by a user. After replacing the attributes/paths for the "missing" element, the test script can continue to replay and will not be blocked (e.g., the object not found error will be fixed). In other words, the present disclosure automatically fixes the object not found error when replaying the script (as illustrated in FIG. 3). This process happens automatically and will not block the test script replay. The changes may also be saved to the test script repository automatically, then on the next run the test script is already updated. The same process may be applied to multiple test scripts for the same or different AUTs.

As illustrated in FIG. 3, the object 218 has moved to a new location. For example, the web page 202 may be re-formatted. The element 218A shows the original location of the element 218 (dotted line surrounding the original location of the element 218). If the test script for testing the web page 202 (e.g., the AUT) is not updated with the new location of the element 218, then an object not found error will be detected. In order to fix this object not found error, the new location of the element 218 (e.g., 218B) must be determined and the test script updated with the new location (e.g., element attributes/path). Once the test script is updated with the new location of the "missing" object (e.g., element 218), the test script may be replayed, and the test may continue. The object not found error may be caused by reformatting of the AUT (elements moved to new locations, elements being removed completely, new elements being added, etc.).

Figure 4:
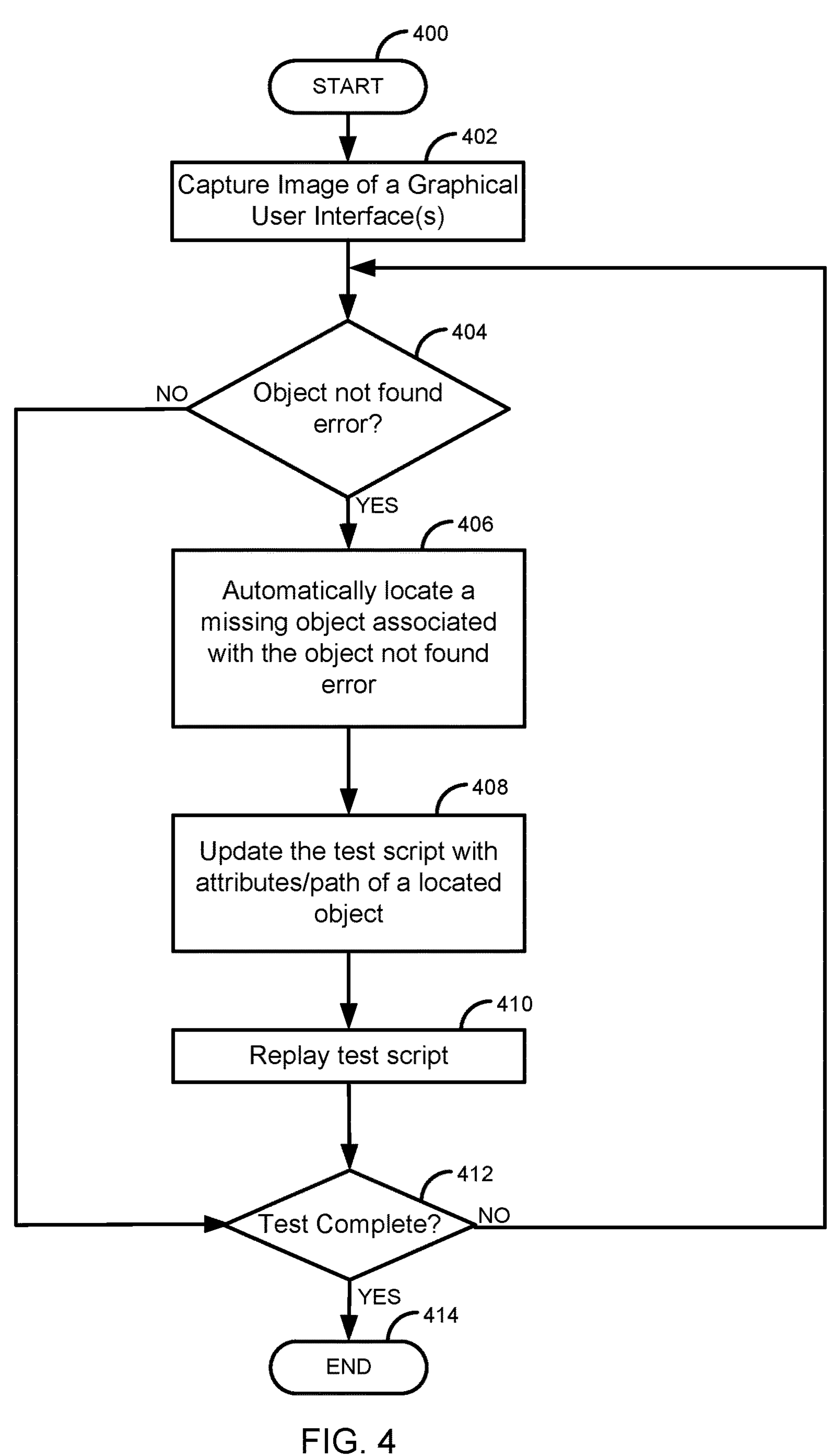
FIG. 4 is a flow diagram of a process for automatically fixing the object not found issue using image recognition in accordance with one or more embodiments of the present disclosure.
Figure 5:
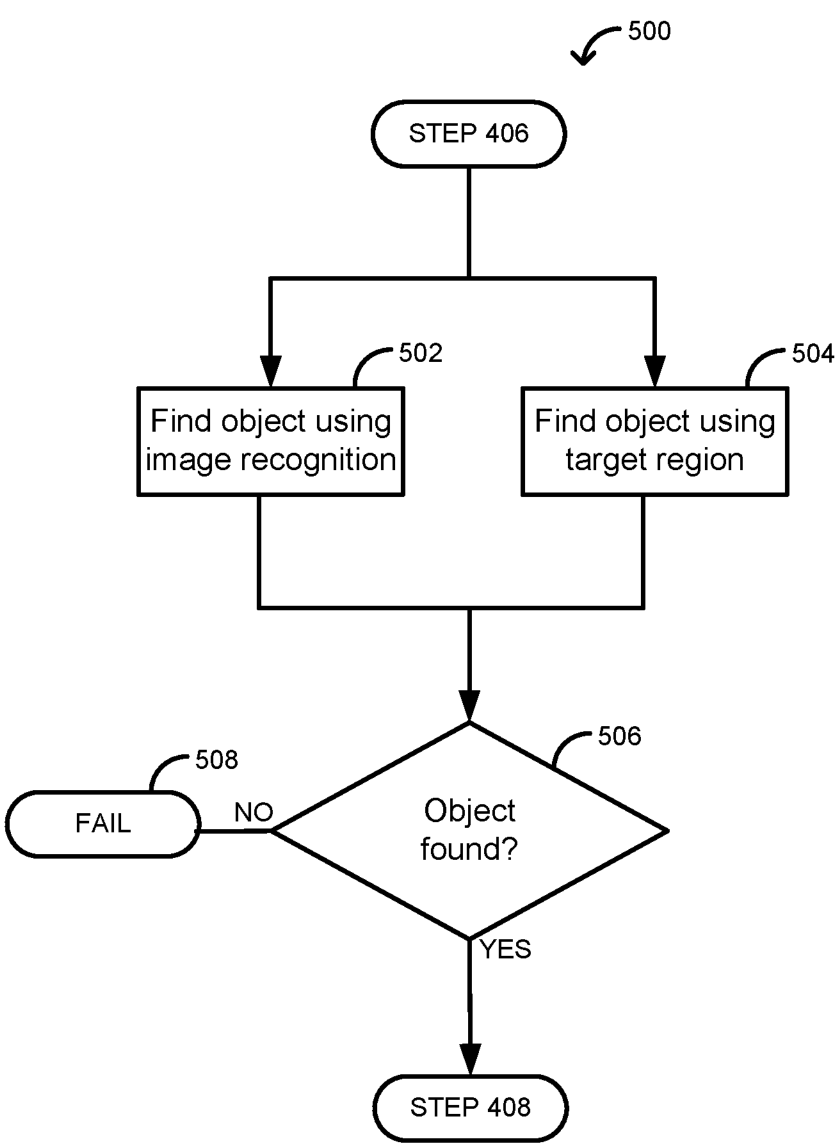
FIG. 5 is a flow diagram of a process for automatically fixing the object not found issue using image recognition in accordance with one or more embodiments of the present disclosure.

Illustratively, the test system 101, the image capture module 103, the test program 104, the code execution module 105, the test server/device 120, and the application under test 121 are stored-program-controlled entities, such as a computer or microprocessor, which performs the methods of FIGS. 4-5 and the processes described herein by executing program instructions stored in a computer readable storage medium, such as a memory (i.e., a computer memory, a hard disk, and/or the like).

Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

FIG. 4 is a flow diagram of a process for automatically fixing an object not found error using image recognition. For example, the process may include identifying one or more of graphical object(s) 212, 214, 216, and 218 in an image of the browser 200/web page 202 (e.g., the AUT).

The process starts in step 400. The image capture module 103 captures, in step 402, an image of a browser 200/web page 202 displayed on a Graphical User Interface (which may be multiple images). The image of the browser 200/web page 202 may be captured by intercepting a video image sent to a display or may be captured via a camera. The image of the browser 200/web page 202 may be an image generated by a client/server application (application under test 121). Alternatively, the captured image of the browser 200/web page 202 may come from a browser that is running a web page provided by the application under test 121. In another embodiment, the test system 101 may be on the test server/device 120.

The code execution module 105 determines, in step 404, if an object not found error is detected in the test program 104. If the object not found error is not detected (NO) in step 404, the process goes to step 412. Otherwise, if the object not found error is detected (YES) in step 404, the code execution module 105 executes, in step 406, the text syntax in order to automatically locate a missing object associated with the object not found error, as described above in FIGS. 2-3.

The code execution module 105, in step 408, updates the test script with attributes/path of a located object, and replays the test script in step 410.

The code execution module 105 determines, in step 412, if the test is complete. If the test is not complete in step 412, the process goes back to step 404. Otherwise, if the testing is complete in step 412, the process ends in step 414.

FIG. 5 is a flow diagram of a process 500 for automatically fixing an object not found error using image recognition. For example, the process may include identifying one or more of graphical object(s) 212, 214, 216, and 218 in an image of the browser 200/web page 202 (e.g., the AUT).

The process proceeds from step 406 in FIG. 4. The AI engine 106 uses image recognition and/or region location to automatically fix an object not found error. In step 502, the AI engine 106 may perform image recognition on an image captured in step 402. Alternatively, or additionally, in step 504, the AI engine 106 may determine a region where the object is located and find the underlying element of the center point of the region (e.g., find missing object using target region). In embodiments, more than one region may be determined. If more than one region is detected, the AI engine 106 may check some key attributes (e.g., tag name, ID, class, role, type, name, or other element type specific attributes) between the old element and all of the candidate elements detected and select the correct region based on the key attributes.

In step 506 the process determines if the "missing" object was found. If the object was found (YES), the process proceeds to step 408 in FIG. 4. If the object is not found (NO), the process fails in step 508, meaning the object not found error could not be corrected. In embodiments, the failure of the process may trigger an alert for manual intervention from a user.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:

a processor; and a memory coupled with and readable by the processor and storing a set of instructions which, when executed by the processor, cause the processor to automatically correct an object not found error by:

running a test script for testing and analysis of a web page as rendered by a web browser;

responsive to detecting the object not found error while running the test script, automatically executing a search for a missing object associated with the object not found error, wherein the search includes determining a target region where the missing object is located, and wherein the search comprises using image recognition on a captured image of a graphical user interface generated during execution of the test script, the search being initiated relative to a computed center point of the target region corresponding to an expected location of the missing object;

locating the missing object and returning information that identifies a target element attribute or path for the missing object;

updating the test script with the returned information that identifies the target element attribute or path for the missing object; and replaying the test script.

2. The system of claim 1, wherein automatically locating the missing object further comprises:

using Artificial Intelligence (AI) image recognition to locate the missing object associated with the object not found error.

3. The system of claim 2, wherein the AI image recognition uses recognized key attributes to locate the missing object associated with the object not found error.

4. The system of claim 3, wherein the key attributes comprise at least one of: a tag name, an identifier, a class, a role, a type, and a name.

5. The system of claim 3, wherein the key attributes are determined by processing a Document Object Model (DOM) associated with the web page.

6. The system of claim 1, wherein automatically locating the missing object associated with the object not found error further comprises:

responsive to more than one object being located in the determined target region, selecting a topmost object for updating the test script with the returned information that identifies the target element attribute or path for the missing object.

7. The system of claim 1, wherein automatically locating the missing object associated with the object not found error further comprises:

responsive to more than one target region being located, determining key attributes for the missing object; and locating the missing object based on the determined key attributes.

8. The system of claim 1, wherein the captured image of the graphical user interface running the test script is captured by intercepting a video image sent to a display.

9. A computer-implemented method to automatically correct an object not found error, the method comprising:

during runtime, executing a test script for testing and analysis of a web page as rendered by a web browser;

responsive to detecting the object not found error while running the test script, automatically executing a search for a missing object associated with the object not found error, wherein the search includes determining a target region where the missing object is located, and wherein the search comprises using image recognition on a captured image of a graphical user interface generated during execution of the test script, the search being initiated relative to a computed center point of the target region corresponding to an expected location of the missing object;

locating the missing object and returning information that identifies a target element attribute or path for the missing object;

updating the test script with the returned information that identifies the target element attribute or path for the missing object; and replaying the test script.

10. The computer-implemented method of claim 9, wherein automatically locating the missing object associated with the object not found error further comprises:

using Artificial Intelligence (AI) image recognition to locate the missing object associated with the object not found error.

11. The computer-implemented method of claim 10, wherein the AI image recognition uses recognized key attributes to locate the missing object associated with the object not found error.

12. The computer-implemented method of claim 11, wherein the key attributes comprise at least one of: a tag name, an identifier, a class, a role, a type, and a name.

13. The computer-implemented method of claim 12, wherein the key attributes are determined by processing a Document Object Model (DOM) associated with the web page.

14. The computer-implemented method of claim 9, further comprising:

responsive to more than one object being located in the determined target region, selecting a topmost object for updating the test script with the returned information that identifies the target element attribute or path for the missing object.

15. The computer-implemented method of claim 9, wherein the captured image of the graphical user interface running the test script is captured by intercepting a video image sent to a display.

16. A non-transitory, computer-readable medium comprising a set of instructions stored which, when executed by a processor, cause the processor to automatically correct an object not found error by:

running a test script for testing and analysis of a web page as rendered by a web browser;

responsive to detecting the object not found error while running the test script, automatically executing a search for a missing object associated with the object not found error, wherein the search includes determining a target region where the missing object is located, and wherein the search comprises using image recognition on a captured image of a graphical user interface generated during execution of the test script, the search being initiated relative to a computed center point of the target region corresponding to an expected location of the missing object;

locating the missing object and returning information that identifies a target element attribute or path for the missing object;

updating the test script with the returned information that identifies the target element attribute or path for the missing object; and replaying the test script.

17. The non-transitory, computer-readable medium of claim 16, wherein the set of instructions, when executed by the processor, cause the processor further to:

automatically locate the missing object associated with the object not found error using Artificial Intelligence (AI) image recognition.

18. The non-transitory, computer-readable medium of claim 16, wherein the set of instructions, when executed by the processor, cause the processor further to:

determine key attributes for the missing object associated with the object not found error, wherein the key attributes comprise at least one of: a tag name, an identifier, a class, a role, a type, and a name.

19. The non-transitory, computer-readable medium of claim 16, wherein the set of instructions, when executed by the processor, cause the processor further to:

responsive to more than one object being located in the determined target region, select a topmost object for updating the test script with the returned information that identifies the target element attribute or path for the missing object.

20. The non-transitory, computer-readable medium of claim 16, wherein the captured image of the graphical user interface running the test script is captured by intercepting a video image sent to a display.

* * * * *